United States Patent [19]
Koishi et al.

[11] Patent Number: 4,687,295
[45] Date of Patent: Aug. 18, 1987

[54] OPTICAL FIBER HAVING POLYMETHACRYLATE CORE AND FLUORO-COPOLYMER CLADDING

[75] Inventors: Toshio Koishi, Sakado; Isao Tanaka, Kawagoe; Takashi Yasumura, Fujimi; Yukitoshi Nishikawa, Shiki, all of Japan

[73] Assignee: Central Glass Company, Limited, Ube, Japan

[21] Appl. No.: 753,986

[22] Filed: Jul. 11, 1985

[30] Foreign Application Priority Data

Jul. 11, 1984 [JP] Japan .................................. 59-142195

[51] Int. Cl.⁴ .................................................. G02B 6/00
[52] U.S. Cl. .................................. 350/96.34; 350/96.29
[58] Field of Search ............... 350/96.29, 96.30, 96.33, 350/96.34

[56] References Cited

U.S. PATENT DOCUMENTS

| | | | |
|---|---|---|---|
| 3,993,834 | 11/1976 | Chimura et al. | 350/96.34 |
| 4,264,129 | 4/1981 | Warkentine | 350/96.34 |
| 4,381,269 | 4/1983 | Kaino et al. | 350/96.34 |
| 4,505,543 | 3/1985 | Ueba et al. | 350/96.34 |
| 4,542,957 | 9/1985 | Ishiwari et al. | 350/96.34 |
| 4,544,235 | 10/1985 | Nishida et al. | 350/96.34 |
| 4,552,431 | 11/1985 | Allemand et al. | 350/96.34 |
| 4,564,263 | 1/1986 | Ueba et al. | 350/96.34 |
| 4,566,755 | 1/1986 | Ohmori et al. | 350/96.34 |
| 4,593,974 | 6/1986 | Yamamoto et al. | 350/96.34 |

FOREIGN PATENT DOCUMENTS 1037498  7/1966  United Kingdom .

Primary Examiner—Robert E. Wise
Attorney, Agent, or Firm—Fleit, Jacobson, Cohn & Price

[57] ABSTRACT

The invention relates to an optical fiber of the step-index type in which the core material is poly(methyl methacrylate) or a copolymer of methyl methacrylate with another methacrylate or an acrylate. A copolymer of vinylidene fluoride with hexafluoroacetone is employed as the cladding material which makes good adhesion to the polymethacrylate core. When the amount of hexafluoroacetone is 4–20 mole %, the copolymer is low in crystallinity, high in transparency, appropriately low in refrax index and higher than 100° C. in softening temperature, and can be extruded under the conditions suited to extrusion of poly(methyl methacrylate).

6 Claims, 2 Drawing Figures

OPTICAL FIBER HAVING POLYMETHACRYLATE CORE AND FLUORO-COPOLYMER CLADDING

BACKGROUND OF THE INVENTION

This invention relates to an optical fiber made of plastics, and more particularly to an optical fiber of the step-index type having a polymethacrylate core and a vinylidene fluoride base copolymer cladding.

Optical fibers that transmit light are used in various articles and facilities including information machines, medical appliances, industrial manufacturing facilities and displays for advertising and other purposes and, above all, will be used extensively and enormously in the field of optical communications.

Optical fibers developed or proposed thus far are classified into inorganic fibers and organic fibers. In inorganic optical fibers silica and multicomponent glasses are principal materials, though in some cases a glass core is cladded with an organic polymer.

For organic optical fibers poly(methyl methacrylate) and polystyrene have been proposed as the core materials, but only the former is used in commercialized plastics optical fibers of the step-index type. This is because poly(methyl methacrylate) is superior to polystyrene in the important characteristics such as the coefficient of cubical expansion, photoelasticity constant, Abbe number and scattering loss. As the cladding material it is necessary to use a polymer of which refractive index is lower than that of the core material. Usually a fluorine-containing polymer is used as will be understood from the order of atomic refraction.

For an optical fiber using poly(methyl methacrylate) as the core material, the following items are required of the cladding material: (1) to be available at low prices, (2) to be higher than about 100° C. in thermosoftening temperature, (3) to be close to the poly(methyl methacrylate) in melting temperature and melt viscosity, (4) to be compatible with poly(methyl methacrylate) and good in adhesion to the same, (5) to be obtained with little impurities, (6) to be chemically stable, (7) to be high in weatherability, (8) to be flexible, (9) to be low in crystallinity, (10) to be high in transparency and (11) to exhibit a refractive index of approximately 1.40. So far, the cladding material has been selected among fluorine-containing acrylic and methacrylic resins and vinylidene fluoride base copolymers. However, it is difficult to find a cladding polymer that fully satisfies the above listed requirements. Fluorine-containing acrylic and methacrylic resins are expensive since the monomers are expensive compounds. Moreover, many of these resins are lower than 100° C. in thermosoftening temperature, and are rather poor in compatibility or mutual solubility with poly(methyl methacrylate) so that a question arises as to the adhesion at the core-cladding interface. It is expected that some vinylidene fluoride base copolymers such as the ones shown in Japanese patent applications provisional publication Nos. 51-52849 and 53-60242 will be produced at relatively low costs. Although these copolymers have balanced properties, strict limitations will have to be placed on the proportions of monomers because these copolymers are not always suited for the cladding purpose in respect of melt viscosity, melting temperature and/or crystallinity.

SUMMARY OF THE INVENTION

It is an object of the present invention to provide an optical fiber of the step-index type made of plastics, which possesses well balanced properties and can be produced at relatively low costs.

The present invention provides an optical fiber comprising a solid cylindrical core formed of a polymer at least a major constituent of which is methyl methacrylate and a cladding layer which is in close contact with the core and is formed of a copolymer of vinylidene fluoride with hexafluoroacetone.

In the copolymer employed as the cladding material, a suitable range of the molar ratio of vinylidene fluoride (VDF) to hexafluoroacetone (HFA) is from 96:4 to 80:20.

A homopolymer of methyl methacrylate is very suitable as the core material, but it is also possible to use a copolymer of a relatively large amount of methyl methacrylate with a relatively small amount of another methacrylate or an acrylate.

Concerning optical fibers using poly(methyl methacrylate) or an analogous polymer as the core material, we have discovered that a cladding material that fully satisfies the requirements shown hereinbefore can be obtained by copolymerizing HFA with VDF in an appropriate proportion. The VDF/HFA copolymers used in this invention have the ether bond —C—O—, which originates in HFA, in the principal chain of the polymer. Therefore, these copolymers are low in crystallinity and high in transparency and flexibility. Furthermore, these copolymers are excellent in processability or formability and can be extruded or moulded under the conditions suited to extrusion or moulding of poly(methyl methacrylate). Owing to the —$CF_3$ groups as the side chains, the VDF/HFA copolymers exhibit sufficiently low refractive indices ranging from 1.38 to 1.41 and are excellent in chemical stability and also in weatherability. The melting points of these copolymers are lower than the melting point of a homopolymer of VDF but are not lower than 100° C. so long as the amount of HFA is within the suitable range. That is, the VDF/HFA copolymers are good in thermal stability and are durable even at elevated temperatures.

HFA is not familiar as an industrial material. However, VDF/HFA copolymers for use in the present invention can be produced at relatively low costs since the amount of HFA in the copolymers is not more than 20% by mole. Copolymerization of VDF and HFA is always carried out in an organic liquid medium, and the copolymer is obtained as a precipitate. Therefore, it is easy to obtain a VDF/HFA copolymer very low in the contents of impurities.

Optical fiber filaments according to the invention are tough and flexible and are very good in the adhesion at the core-cladding interface. Accordingly the optical fiber filaments can withstand bending and constrictive stroking.

Of course it is permissible to cover the outer side of the cladding layer with a protecting or reinforcing layer.

The invention can be understood by reference to the accompanying drawings.

DESCRIPTION OF THE PREFERRED EMBODIMENTS

Figure 1:
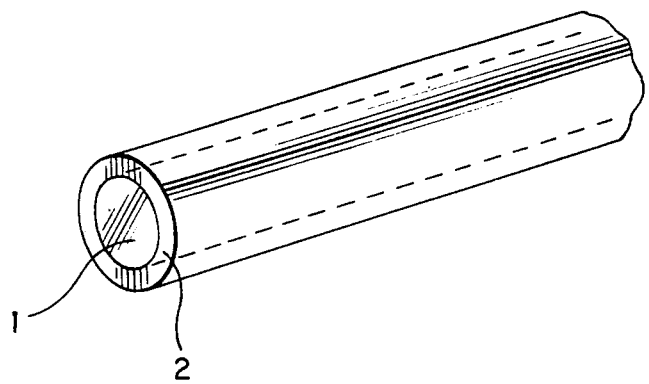
FIG. 1 is a perspective view of an optical fiber of the invention.
Figure 2:
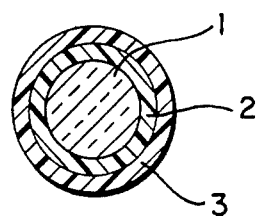
FIG. 2 is a cross-sectional view of an optical fiber having an additional protecting or reinforcing layer.

Poly(methyl methacrylate) is the best material for the core of an optical fiber according to the invention, and it is possible to make use of high-grade poly(methyl methacrylate) resins in the market. It is also possible to use a copolymer of methyl methacrylate with another methacrylate or an acrylate. Examples of suitable comonomers are ethyl methacrylate, n-propyl methacrylate, n-butyl methacrylate, 2-ethylhexyl methacrylate, methyl acrylate, ethyl acrylate, n-propyl acrylate, n-butyl acrylate and 2-ethylhexyl acrylate. In the case of a copolymer, it is desirable that the amount of methyl methacrylate in the copolymer is at least 70% by mole so that the favorable properties of poly(methyl methacrylate) may not significantly be lost by copolymerization.

A copolymer of VDF with HFA is the cladding material characteristic of an optical fiber of the invention. In this copolymer a suitable range of the molar ratio of VDF to HFA is from 96:4 to 80:20, and a preferable range is from 96:4 to 88:12. Within the suitable range of VDF/HFA ratio, the refractive index of the copolymer falls in the range from 1.41 to 1.38 and the melting point in the range from about 100° C. to about 165° C. As the proportion of HFA increases the copolymer becomes more transparent, and a melt-indicating peak in a thermal analysis chart obtained by differential scanning calorimetry becomes less sharp. These facts indicate that the crystallinity of PVDF is effectively reduced by the introduction of HFA. However, VDF/HFA copolymers containing less than 4 mole% of HFA are unsuitable as the cladding material because of insufficient transparency which is attributed to the abundance of the crystalline component. On the other hand, VDF/HFA copolymers containing more than 20 mole% of HFA are lower than about 100° C. in melting point or thermosoftening temperature so that a limit is placed on the use of optical fibers comprising such copolymers.

A suitable VDF/HFA copolymer can be prepared by radical copolymerization reaction, which is carried out in an organic liquid medium in the presence of an oil-soluble radical polymerization initiator usually at a temperature in the range from about 0° C. to about 70°. As the organic liquid medium, either a saturated hydrocarbon such as n-hexane or n-heptane, for example, or a florine-containing solvent such as trichlorotrifluoroethane or dichlorotetrafluoroethane can be used. It is undesirable to use water as the liquid medium for the copolymerization reaction or to add water to the organic liquid medium since HFA readily reacts with water. At the end of the radical copolymerization reaction, the reaction system is in the form of slurry containing a precipitated copolymer. By filtration and drying, a VDF/HFA copolymer powder of a particle size suitable to extrusion operation is obtained.

With respect to solutions of VDF/HFA copolymers employed in this invention in N,N-dimethylacetamide, intrinsic viscosity ($\eta$) at 30° C. is in the range from 0.5 to 2.0 dl/g. The same copolymers exhibit melt indices ranging from 1 to 20 g/10 min when measured at 230° C. under a load of 3800 g by the method according to ASTM D 1238. That is, the VDF/HFA copolymers are close to poly(methyl methacrylate) in melt viscosity. The VDF/HFA copolymers are excellent in thermal stability and also in weatherability. Samples of the copolymers were subjected to an accelerated weathering test for more than 1000 hr, but no change was observed in the appearance of the samples.

Usually an optical fiber according to the invention is produced by a melt extrusion method using an extruder that has two extrusion cylinders and an extrusion die-spinneret unit designed so as to form the core and cladding simultaneously. On an experimental basis it was evidenced that highly transparent optical fibers according to the invention can be produced by a simultaneous extrusion method, and these optical fibers were confirmed to be fully satisfactory in the closeness and strongness of adhesion at the core-cladding interface by bending and constrictive stroking tests and by observation of the sections of severed fiber filaments.

It is also possible to produce an optical fiber of the invention by coating a filament of poly(methyl methacrylate) with a solution of a VDF/HFA copolymer. This is because VDF/HFA copolymers containing at least 4 mole % of HFA are highly soluble in commonplace ketones and esters such as acetone, methyl ethyl ketone and ethyl acetate.

The invention will further be illustrated by the following nonlimitative examples.

EXAMPLE 1

First, 17 liters of 1,1,2-trichloro-1,2,2-trifluoroethane (will be referred to as F-113) and 150 g of 4.5% solution of hexafluorobutyryl peroxide in F-113 were charged in a 34-liter stainless steel autoclave, which was provided with a stirrer and was dried in advance. After complete replacement of the gas atmosphere in the autoclave by nitrogen gas, the pressure in the autoclave was reduced to 200 mmHg. Then 1655 g of HFA monomer was introduced into the autoclave and, next, 1690 g of VDF monomer. Therefore, the HFA/VDF molar ratio was 28/72. Operating the stirrer, the monomers in the autoclave were subjected to radical copolymerization reaction at 20° C. for 24 Hr. The pressure (gauge pressure) in the autoclave was 4.5 kg/cm$^2$ at the start of the reaction and reduced to 1.1 kg/cm$^2$ at the end of the reaction. After the reaction an unreacted portion of HFA was recovered by absorption in water. The slurry containing the precipitated copolymer was centrifuged, and the separated precipitate was dried under vacuum at 60° C. The yield of a VDF/HFA copolymer powder obtained by this process was 49%.

From elementary analysis with respect to carbon, the molar ratio of VDF to HFA in this copolymer was determined to be 91.0:9.0. The melting point of this copolymer was measured to be 122° C. by differential scanning calorimetry. The intrinsic viscosity ($\eta$) of a solution of this copolymer in N,N-dimethylacetamide was 1.10 dl/g at 30° C. This copolymer had a specific gravity of 1.79 and exhibited a melt index of 4.14 g/10 min when measured at 230° C. under a load of 3800 g by the method according to ASTM D 1238.

The VDF/HFA copolymer was press-shaped into a film having a thickness of about 100 μm. This film was tough and transparent. By measurement of the copolymer film with an absorption spectrometer for ultraviolet and visible regions, no absorption was observed within the wavelength range from 210 to 800 nm. By measurement with Abbe's refractometer of Type II using the D-line of sodium and methyl salicylate as the intermediate liquid, the refractive index of the copolymer film was 1.393.

The VDF/HFA copolymer was confirmed to be stable to both acid and alkali by a chemical resistance test generally in accordance with ASTM D 543. In an accelerated weathering test using a sunshine weatherometer, no change was observed in the appearance of the copolymer samples after the lapse of 1000 hr. The formability of this copolymer was tested by using an extruder having a cylinder diameter of 30 mm. Extrusion of the copolymer into rods and films was accomplished without difficulty, and the obtained rods and films were all colorless and transparent. This test proved the copolymer to be excellent also in thermal stability at processing.

To produce an optical fiber by using this VDF/HFA copolymer as the cladding material, a commercial poly(methyl methacrylate) resin which exhibits a melt index of 4 g/10 min at 230° C. was employed as the core material. An optical fiber filament having a diameter of 1.0 mm was obtained by an extrusion operation using an extruder equipped with a die-spinneret unit which can form the core and cladding simultaneously. Both the core material and the cladding material were extruded at 230° C. Through this optical fiber filament, percent transmission of white light emitted from a tungsten lamp was 72% over a transmittance distance of 50 cm.

EXAMPLE 2

Using the same apparatus as in Example 1, 1250 g of HFA and 1900 g of VDF were subjected to radical copolymerization in a mixture of 17 liters of F-113 and 150 g of 4.5% solution of hexafluorbutyryl peroxide in F-113. Therefore, the HFA/VDF molar ratio was 20/80. The reaction was carried out at 20° C. for 24 hr. The pressure (gauge pressure) in the autoclave was 5.0 kg/cm$^2$ at the start of the reaction and reduced to 1.0 kg/cm$^2$ at the end of the reaction. The yield of a VDF/HFA copolymer powder obtained by this process was 58.7%.

By elementary analysis with respect to carbon, the molar ratio of VDF to HFA in this copolymer was determined to be 92.8:7.2. This copolymer had a specific gravity of 1.77 and a melting point of 131° C. and exhibited a melt index of 1.03 g/10 min at 230° C. The intrinsic viscosity of a solution of this copolymer in N,N-dimethylacetamide was 1.31 dl/g at 30° C.

This VDF/HFA copolymer was press-shaped into a 100 μm thick film, which was transparent and exhibited a refractive index of 1.398. In other properties, this copolymer was almost similar to the VDF/HFA copolymer prepared in Example 1.

Using this copolymer as the cladding material and the poly(methyl methacrylate) resin mentioned in Example 1 as the core material, an optical fiber filament having a diameter of 1.0 mm was produced by the same extrusion method as in Example 1. Through this optical fiber filament, percent transmission of white light from a tungsten lamp was 69% over a transmission distance of 50 cm.

EXAMPLE 3

First, 350 ml of F-113 and 0.32 g of diisopropylperoxy dicarbonate were charged in a 500 ml stainless steel autoclave, which was provided with a stirrer and was dried in advance. After complete replacement of the gas atmosphere in the autoclave by nitrogen gas, the autoclave was cooled to −78° C. and the inner pressure was reduced to below 10 mmHg. Then 35.10 g of HFA monomer and 53.07 g of VDF monomer were introduced into the autoclave. Therefore, the HFA/VDF molar ratio was 20/80. The temperature of the reaction system was raised to 40° C., and at this temperature the monomers in the autoclave were subjected to radical copolymerization reaction for 24 hr. The pressure (gauge pressure) in the autoclave was 7.8 kg/cm$^2$ at the start of the reaction and reduced to 1.8 kg/cm$^2$ at the end of the reaction.

After the reaction unreacted portions of the monomers were recovered and the slurry containing the precipitated copolymer was poured into methanol. The precipitate was separated by filtration and was dried to obtain a VDF/HFA copolymer powder. The yield of the copolymer was 53.2%.

By elementary analysis with respect to carbon, the molar ratio of VDF to HFA in this copolymer was determined to be 91.7:8.3. This copolymer had a melting point of 126° C. and exhibited a melt index of 13.2 g/10 min when measured at 230° C. under a load of 4160 g by the method according to ASTM D 1238. The intrinsic viscosity ($\eta$) of a solution of this copolymer in N,N-dimethylacetamide was 0.84 dl/g at 30° C.

This VDF/HFA copolymer was press-shaped at 230° C. into a 100 mm thick film, which was transparent and exhibited a refractive index of 1.395.

Using this copolymer as the cladding material and a commercial poly(methyl methacrylate) resin which exhibits a melt index of 10 g/10 min at 230° C. as the core material, an optical fiber filament having a diameter of 1.0 mm was produced by the same extrusion method as in Example 1. Through this optical fiber filament, percent transmission of white light from a tungsten lamp was 74% over a transmission distance of 50 cm.

EXAMPLE 4

Using the same apparatus and procedure as in Example 3, 35.61 g of HFA and 55.87 g of VDF were subjected to radical copolymerization reaction in a mixture of 350 ml of F-113 and 0.43 g of t-butylperoxy 2-ethylhexanoate. Therefore, the HFA/VDF molar ratio was 20/80. The reaction was carried out at 65° C. for 24 hr. The pressure (gauge pressure) in the autoclave was 12.7 kg/cm$^2$ at the start of the reaction and reduced to 7.8 kg/cm$^2$ at the end of the reaction. The yield of a VDF/HFA copolymer powder obtained by this process was 36.6%.

By elementary analysis with respect to carbon, the molar ratio of VDF of HFA in this copolymer was determined to be 93.4:6.6. This copolymer had a melting point of 130° C. and exhibited a melt index of 18.5 g/10 min at 230° C. The intrinsic viscosity of a solution of the copolymer in N,N-dimethylacetamide was 0.67 dl/g at 30° C. A film obtained by press-shaping of this copolymer at 230° C. exhibited a refractive index of 1.400.

Using this VDF/HFA copolymer as the cladding material and the poly(methyl methacrylate) resin mentioned in Example 3 as the core material, an optical fiber filament having a diameter of 1.0 mm was produced by the same extrusion method as in Example 1. Through this optical fiber filament, percent transmission of white light from a tungsten lamp was 68% over a transmission distance of 50 cm.

EXAMPLE 5

The VDF/HFA copolymer prepared in Example 1 was dissolved in ethyl acetate to obtain 20 wt % solution. With a rotational viscometer of the B type, the viscosity of this solution at 27° C. was measured to be 180 cp.

A filament of poly(methyl methacrylate) having a diameter of 0.8 mm was submerged in the copolymer solution. The filament wetted with the solution was dried to completely evaporate the solvent. As the result, the filament was entirely cladded with the VDF/HFA copolymer. That is, an optical fiber filament was obtained by this simple method. Through this optical fiber filament, percent transmission of white light from a tungsten lamp was 70% over a transmission distance of 50 cm.

What is claimed is:

1. An optical fiber comprising:

a solid cylindrical core formed of a polymer at least a major constituent of which is methyl methacrylate; and a cladding layer which is in close contact with the core and is formed of a copolymer of vinylidene fluoride with hexafluoroacetone.

2. An optical fiber according to claim 1, wherein the molar ratio of vinylidene fluoride to hexafluoroacetone in said copolymer is in the range from 96:4 to 80:20.

3. An optical fiber according to claim 2, wherein said molar ratio is in the range from 96:4 to 88:12.

4. An optical fiber according to claim 1, wherein said polymer as the core material is a homopolymer of methyl methacrylate.

5. An optical fiber according to claim 1, wherein said polymer as the core material is a copolymer of methyl methacrylate with a methacrylate or acrylate selected from the group consisting of ethyl methacrylate, n-propyl methacrylate, n-butyl methacrylate, 2-ethylexyl methacrylate, methyl acrylate, ethyl acrylate, n-propyl acrylate, n-butyl acrylate and 2-ethylhexyl acrylate.

6. An optical fiber according to claim 5, wherein methyl methacrylate occupies at least 70 mole % of said copolymer as the core material.

* * * * *